Nov. 8, 1960 G. E. FLINN 2,959,070
ACCESSORY DRIVE
Filed Jan. 9, 1959 3 Sheets-Sheet 1

Inventor:
George E. Flinn
By: Keith J. Blewett

Nov. 8, 1960

G. E. FLINN 2,959,070

ACCESSORY DRIVE

Filed Jan. 9, 1959

Inventor:
George E. Flinn
By Keith J. Bleuer Atty.

Nov. 8, 1960   G. E. FLINN   2,959,070
ACCESSORY DRIVE
Filed Jan. 9, 1959   3 Sheets-Sheet 3

Inventor:
George E. Flinn

United States Patent Office 2,959,070
Patented Nov. 8, 1960

2,959,070

ACCESSORY DRIVE

George E. Flinn, Muncie, Ind., assignor to Borg-Warner Corporation, Chicago, Ill., a corporation of Illinois Filed Jan. 9, 1959, Ser. No. 785,901

9 Claims. (Cl. 74—664)

My invention relates to gearing and in particular to gearing for driving various power driven accessories in an automotive vehicle.

Such accessories, such as an electrical power generator, an engine cooling fan, an engine cooling water pump, a pump for supplying fluid pressure for power steering, a compressor for the vehicle air conditioner, and a compressor for supplying air pressure for vehicle air springs generally have been driven from the crankshaft of the vehicle engine by means of pulleys and belt. At relatively low engine idling speeds, due to the uni-ratio connection between the engine and the accessories, generally the accessories are not driven at sufficient high speeds so that the power output from the accessories is sufficient to actuate the devices driven from the accessories, if the accessories are not overspeeded at relatively high engine speeds. For example, at the relatively low speeds of the engine at idling, the fan rotates too slowly for effective cooling of the engine, the engine cooling water pump does not supply sufficient volume of coolant for the engine, the power steering pump does not supply sufficient fluid pressure for turning the front wheels of the vehicle, the refrigerant compressor for the air cooling system does not supply sufficient output for cooling the vehicle, and the generator is not effective to charge the battery of the vehicle.

It is, therefore, an object of the present invention to provide accessory drive gearing which is effective for driving the accessories connected to the gearing at an overdrive speed ratio under engine idling conditions.

More specifically, it is an object of the invention to provide such an improved gearing which is driven from both the engine crankshaft and also from an output part and in particular from the output shaft of the vehicle transmission.

It is also an object to provide such an improved gearing which is of the differential planetary type driven from both the crankshaft of the vehicle engine and also from the driven part and which drives the accessory in an overdrive ratio with respect to the engine crankshaft when the vehicle is stationary and which is so arranged that the ratio of the gearing gradually decreases as the speed of the driven shaft of the transmission increases with increasing vehicle speeds.

The invention consists of the novel constructions, arrangements, and devices to be hereinafter described and claimed for carrying out the above stated objects and such other objects as will be apparent from the following description of preferred forms of the invention illustrated with reference to the accompanying drawings, wherein:

Like characters of reference designate like parts in the several views.

Figure 1:
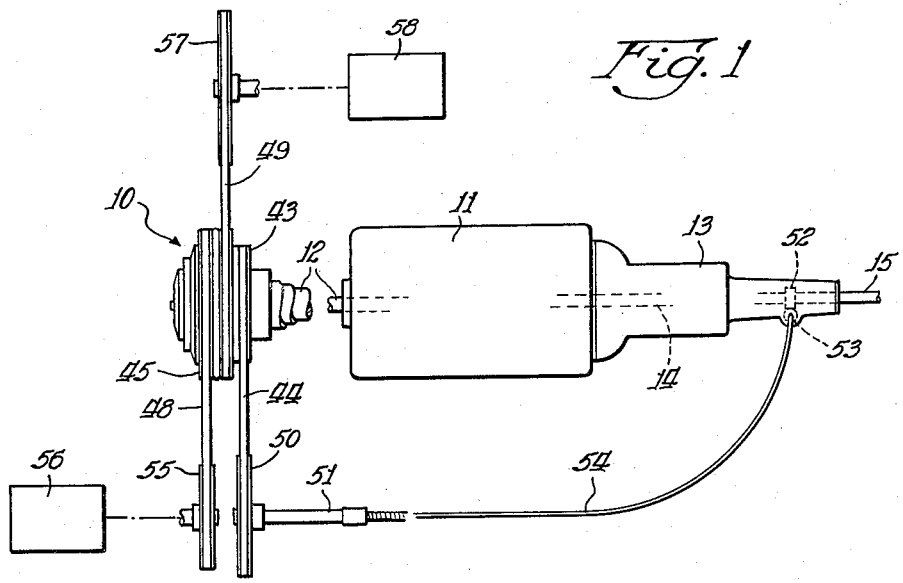
Fig. 1 is an elevational view of the accessory drive gearing of the invention together with schematic showings of the vehicle engine and transmission and various accessories driven by the gearing and connected in driving relationship by belts and pulleys.
Figure 2:
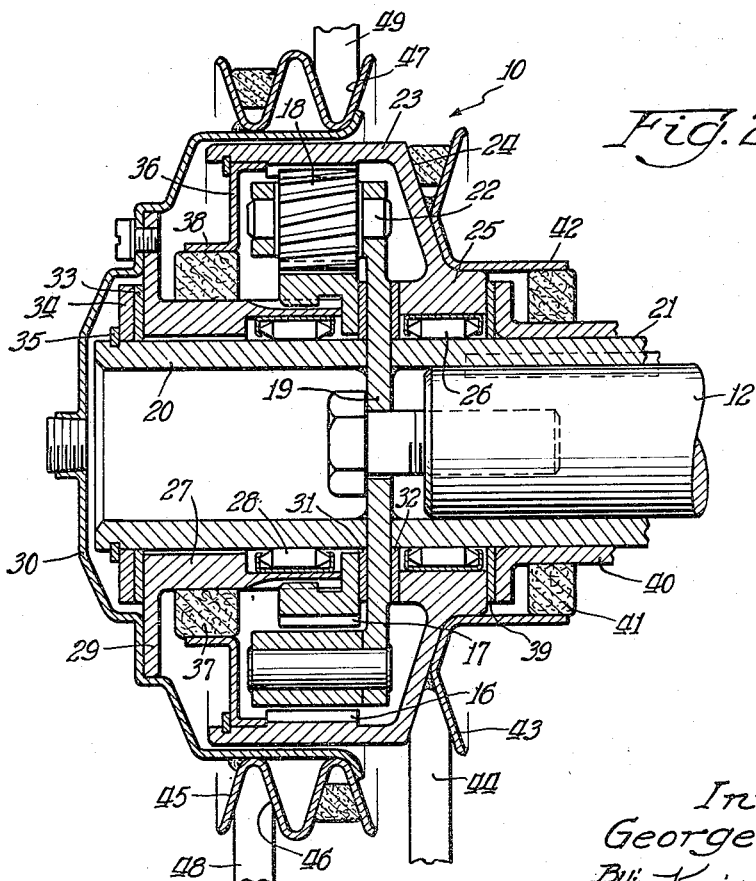
Fig. 2 is a longitudinal sectional view of the gearing taken on an enlarged scale.

Referring now to the drawings, the accessory drive gearing unit 10 as illustrated in Figs. 1 and 2 may be seen to be disposed on the front end of the vehicle engine 11, the gearing 10 being driven from the front end of the engine crankshaft 12. The engine 11 drives a transmission 13 and particularly the transmission drive shaft 14, and the transmission 13 has the usual driven shaft 15 which is connected to the usual rear differential (not shown) of the vehicle. The transmission is of conventional construction and may, for example, comprise a hydraulic torque converter driving the driven shaft 15 through multi-ratio gearing.

The gearing unit 10 is of the simple planet gear type and comprises a ring gear 16, a sun gear 17, a plurality of planet gears 18 each in mesh with the sun and ring gears and a planet gear carrier 19. The planet gear carrier 19 is in the form of an annular disc which is fixed between two sleeves 20 and 21, the latter of which is splined on to the front end of the engine crankshaft 12. Each of the planet gears 18 is rotatably disposed on a stub shift 22 fixed within the carrier disc 19.

The ring gear 16 is formed within a hollow shell 23 having an obliquely extending surface 24 and having a hub portion 25 rotatably journalled on the sleeve 21 by means of needle bearings 26. The sun gear 17 is splined on to a sleeve 27 which is rotatably journalled on the sleeve 20 by means of needle bearings 28. The sleeve 27 is provided with an end flange 29 to which is fixed a sheet metal exterior housing 30.

Bearing rings 31 and 32 are disposed on opposite sides of the carrier disc 19, between the disc 19 and the hub portion 25 and the sun gear 17. A bearing ring 33 and a retainer ring 34 are provided at the end of the sleeve 27, and these parts are held in place by means of a spring retainer ring 35 disposed at an end groove in the sleeve 20 for the purpose of holding the gears in operative relationship.

An annular sheet metal stamping 36 is fixed in place within the shell 23, and a flexible annular sealing ring 37 is disposed between the sleeve 27 and a cylindrical flange 38 formed on the stamping 36.

A bearing ring 39 is disposed between the hub portion 25 and an external housing sleeve 40, and a sealing ring 41 is provided between the cylindrical portion of a stamping 42 fixed to the shell 23 and the housing sleeve 40.

The stamping 42 is provided with an obliquely extending part 43 which with the opposite obliquely extending surface 24 provides a pulley for a V-belt 44. An annular sheet metal part 45 is fixed on the outer surface of the shell 30 and is formed with two V-shaped grooves 46 and 47 which constitute pulleys for receiving V-belts 48 and 49.

The V-belt 44 is disposed within a pulley 50 fixed on a shaft 51 rotatably mounted within a part (not shown) fixed with respect to the vehicle engine 11. The shaft 51 is drivingly connected by means of gears 52 and 53 and a flexible shaft 54 with the transmission driven shaft 15. The gear 52 is fixed on the shaft 15, and the gear 53 is held in meshed relationship with the gear 52 and is fixed to one end of the flexible shaft 54, the shaft 54 being fixed on its opposite end to the shaft 51.

The V-belt 48 extends around a pulley 55 which is disposed on an accessory 56, and the V-belt 49 extends around a pulley 57 disposed on another accessory 58. Either of the accessories 56 and 58 may be, for example, the electrical generator of the vehicle, the engine cooling fan, engine water pump, a pump for providing fluid pressure for power steering, a compressor for the vehicle air conditioning system, and an air compressor for the vehicle air springs.

The planetary gear unit 10 may be self-lubricated, simply by providing a body of lubricant within the shell 23. The lubricant is maintained within the shell and in lubricating relationship with the gears 16, 17, and 18 by means of the stamping 36 and sealing ring 37 on one end and the stamping 42 and sealing ring 41 on the other end.

In operation, initially the vehicle may be assumed to be stationary. Under these conditions, the shaft 12 initially is rotating at engine idling speed which may, for example, be about 500 r.p.m. The ring gear 16 is stationary, and the planet gear carrier 19, being fixed to the engine drive shaft 12, rotates at engine idling speed. The planet gears 18 planetate within the stationary ring gear 16 and drive the sun gear 17 at an overdrive speed ratio with respect to the speed of rotation of the engine drive shaft 12. For particular sizes of gears 16, 17, and 18, the sun gear 17 may be driven at 2.5 times the speed of the engine crankshaft 12, for example. The sun gear 17 is connected through the sleeve 27 with the exterior housing 30 on which the pulley forming member 46 is fixed, and the pulleys 46 and 47, therefore, are likewise driven at an overdrive speed with respect to the speed of the shaft 12. The belts 48 and 49 drive the accessories 56 and 58 by means of the pulleys 55 and 57, and the pulleys 55 and 57 and the accessories 56 and 58 are therefore likewise driven at increased speeds compared to the speeds they would be driven if the pulleys 45 and 47 were rotating at the speed of the engine crankshaft 12, so that if either of the accessories 56 and 58 is an electrical generator, greater electrical power output is obtained; if either is a power steering pump, greater output pressure is obtained sufficient for turning the front vehicle wheels under engine idling conditions; if either is the compressor for the vehicle air conditioning system, the vehicle is cooled under engine idling conditions; if either is a water pump, greater engine cooling is obtained; and if either is the engine fan, the engine is maintained cooler.

As the speed of the transmission driven shaft 15 and the vehicle increase, the shell 23 begins rotation, being driven through the gears 52 and 53, the flexible shaft 54, the shaft 51, the pulley 50 and the belt 44. This rotation of the ring gear 16 reduces the ratio of the sun gear 17 and pulleys 46 and 47 with respect to the drive shaft 12, although the absolute speed of the pulleys 46 and 47 may not decrease. As the speed of the vehicle increases still further, and the speed ratio through the transmission 13 increases from a low speed ratio to a high speed ratio (which is 1 to 1 for most transmissions) under these conditions the shafts 12 and 15 rotate substantially in unison, at the same speed, and the ring gear 16 rotates at substantially the same speed as the sun gear 17 assuming, for example, that the ratio between the shaft 15 and the shell 23 is 1 to 1, and there is no differential effect within the planetary gearing. At this time, the planet gear carrier 19 rotates at substantially the same speed as the sun gear 16 and ring gear 17, and the speed ratio between the pulleys 46 and 47 and the engine crankshaft 12 has decreased to substantially 1 to 1, so that the accessories 56 and 58 are driven at a reduced speed ratio with respect to the speed ratio at which they were driven under engine idling conditions, with the vehicle stationary.

Figure 3:
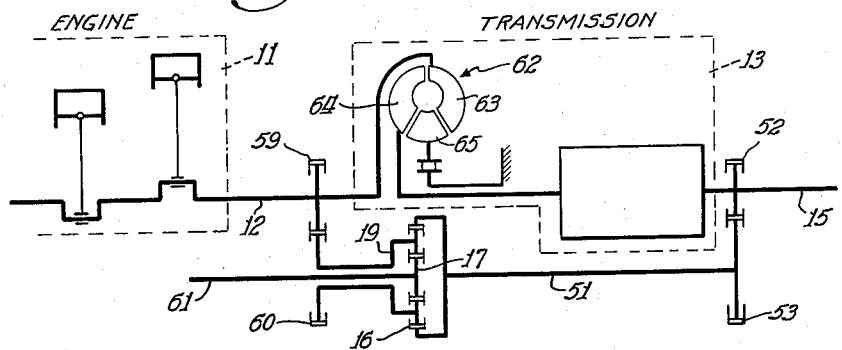
Fig. 3 is a schematic illustration of the gearing connected to the engine crankshaft and transmission output shaft by means of gears in lieu of belts and pulleys.

The accessory drive mechanism shown schematically in Fig. 3 is substantially the same as that illustrated in Figs. 1 and 2, except that gears 59 and 60 are utilized for driving the carrier 19 in lieu of the direct connection to the engine crankshaft 12. A shaft 61 is utilized for driving an accessory off the sun gear 17 of the planet gear set. In Fig. 3, the hydraulic torque converter 62 in the transmission 13 is illustrated, the hydraulic torque converter comprising a bladed impeller 63, a bladed runner 64, and a bladed stator 65. The Fig. 3 embodiment functions in substantially the same manner as the embodiment shown in Figs. 1 and 2.

Figure 5:
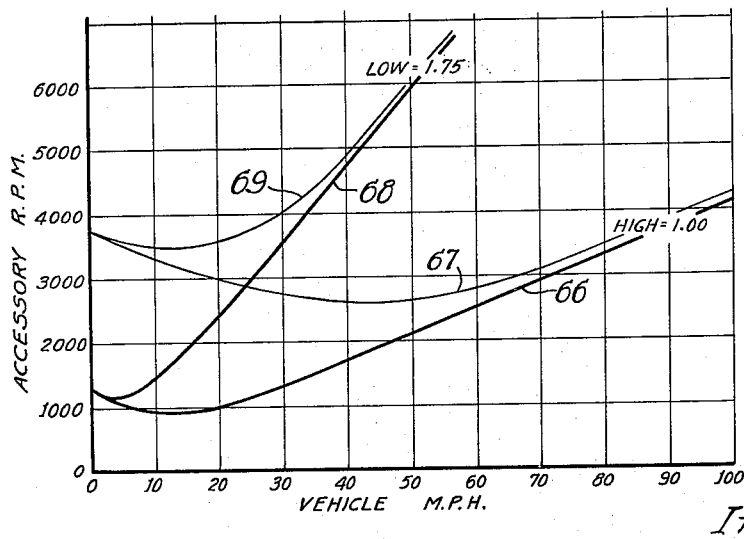
Fig. 5 is a graph illustrating the variable speeds of an accessory driven by the mechanism illustrated in Fig. 3, when the transmission is a two speed transmission.

The graph of Fig. 5 sets forth the speed of rotation of an accessory with respect to vehicle speed for certain embodiments of the invention of the types shown in Figs. 1 and 2 and also in Fig. 3, assuming that the transmission 11 provides only two geared ratios, namely low and high. Curves 66 and 67 illustrate the speeds of the accessory when the transmission is in high speed ratio. Curve 66 is for the condition of relaxed throttle, that is, with the throttle relaxed just enough to provide the various vehicle speeds indicated on the abscissae. It will be noted that the speed of the accessory is substantially 1250 r.p.m. under engine idling conditions with the vehicle stationary, and that the accessory at first decreases in speed and then subsequently increases in speed from about 20 m.p.h. to 100 m.p.h. vehicle speed. With the throttle completely open as indicated by curve 67, and the vehicle held stationary by the vehicle brakes, the accessory r.p.m. initially is approximately 3750 r.p.m., and the accessory speeds decrease with increasing vehicle speeds until about 45 m.p.h. is reached, and then the accessory speeds subsequently increase.

Curves 68 and 69 are respectively relaxed throttle and maximum open throttle curves for the low speed drive through the transmission, and the curves correspond to the curves 66 and 67 respectively. It will be noted that the curves 68 and 69 start from the same points at zero m.p.h. as the curves 66 and 67, but the curves 68 and 69 increase more quickly, at lower speeds of the vehicle.

Figure 6:
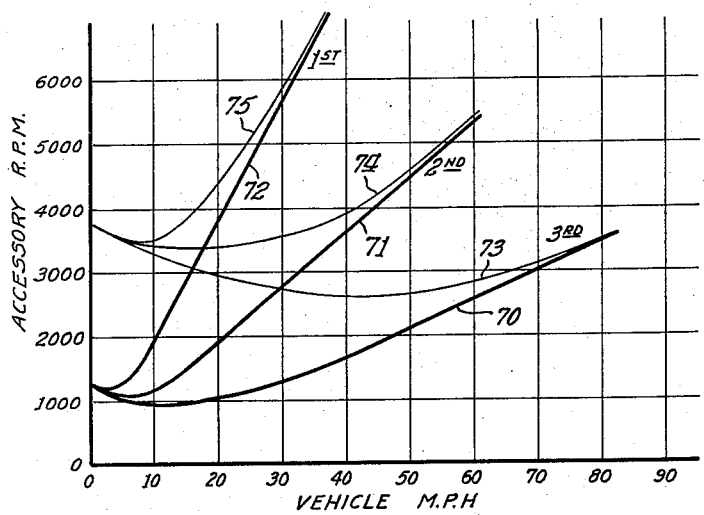
Fig. 6 is a graph similar to Fig. 5 wherein the transmission is a three speed transmission.

The graph of Fig. 6 corresponds to that of Fig. 5, and the curves 70, 71 and 72 are relaxed throttle curves corresponding to the curves 66 and 68. The curves 70, 71, and 72 are respectively for third, second, and first speed ratios in the transmission, assuming that a three ratio transmission has been provided in lieu of the two ratio transmission to which the Fig. 5 graph is directed. The cuves 73, 74, and 75 are curves for the wide open throttle conditions respectively for third, second, and first gears through the transmission.

Figure 4:
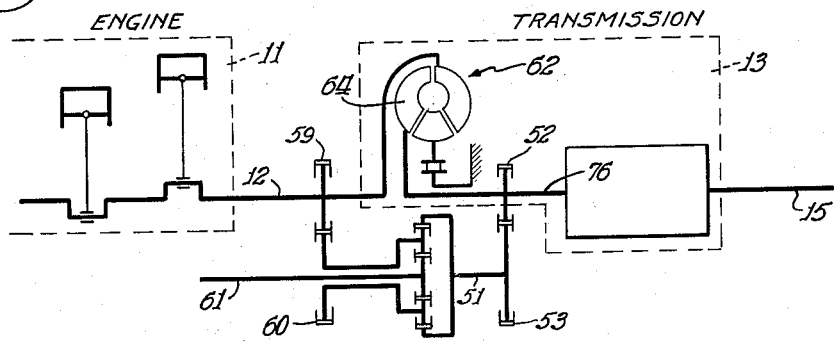
Fig. 4 is a view similar to Fig. 3 in which the accessory gearing is driven by a transmission intermediate shaft instead of the transmission output shaft.

The embodiment shown schematically in Fig. 4 is substantially the same as that illustrated in Fig. 3, except that the gear 52 is mounted on the intermediate shaft 76 of the transmission 13 which is driven directly from the runner 64 of the torque converter 62. In the case of the Fig. 4 embodiment, the mechanical ratio that happens to exist between the shaft 76 and the output shaft 15 of the transmission 13 has no effect on the speed at which the accessory is driven from the accessory shaft 61, and it is only the speed of the shaft 12 and the slip of the torque converter 62 which determine the speed of the accessory drive shaft 61.

Figure 7:
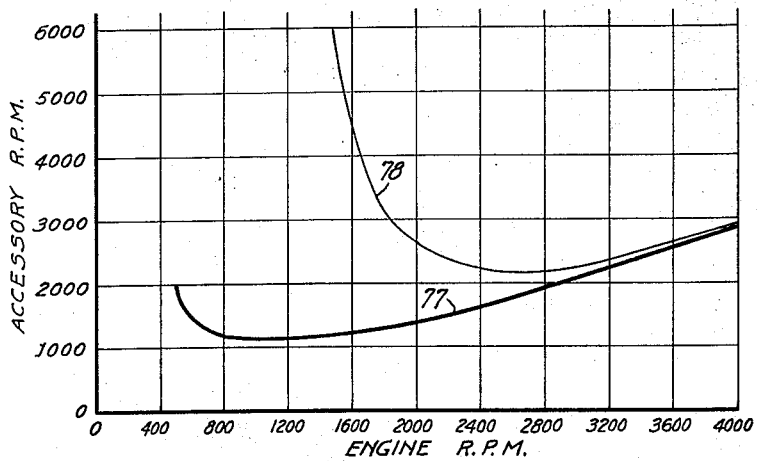
Fig. 7 is a graph similar to those of Figs. 5 and 6 utilizing the gearing drive mechanism shown in Fig. 4.

The Fig. 7 graph illustrates the curves 77 and 78 for a Fig. 4 embodiment showing the relationship between accessory r.p.m. and engine r.p.m. The curve 77 is for minimum throttle opening, just sufficient for driving the vehicle at increasing speeds; and the curve 78 is for the condition of wide open throttle, with the vehicle brakes being utilized when necessary to hold the engine speeds to those indicated on the abscissa of the Fig. 7 graph. It will be noted that under relaxed throttle conditions, the accessory is driven initially at substantially 2000 r.p.m. and decreases at first and then finally increases to a higher speed. The curve 78 on the other hand starts at a much higher accessory speed (6000 as seen in the graph) and decreases quite rapidly and then subsequently increases slightly.

Advantageously, the planetary units 10, by being connected to both the engine crankshaft and to either the transmission driven shaft, or the transmission intermediate shaft driven directly by a transmission torque converter, drive an accessory at an initial high speed ratio with respect to the engine crankshaft when the vehicle is stationary so that the accessories may be operative at this time to perform the functions for which they are intended. As the speed of the vehicle increases, the speed ratio at which the accessories are driven with respect to the engine crankshaft is automatically reduced due to the functioning of the differential gearing. The embodiment of the invention illustrated in Fig. 4 advantageously performs the same regardless of the mechanical speed ratio through the transmission, and there is no possibility with this embodiment that unduly high accessory speeds may be reached when the transmission is in neutral or is driving in reverse.

I wish it to be understood that my invention is not to be limited to the specific constructions and arrangements shown and described, except only insofar as the claims may be so limited, as it will be understood to those skilled in the art that changes may be made without departing from the principles of the invention.

I claim:

1. In an accessory driving mechanism adapted to be driven by an engine, the combination of an output member, a power transmission device for driving said output member from said engine, a planetary gear set having a sun gear element and a ring gear element and planet gears in mesh with said elements and a planet gear carrier, said carrier being connected with said engine to be driven thereby, and means drivingly connecting said output member with one of said elements whereby said other element is driven at an overdrive ratio with respect to the engine when said output member is stationary for driving an accessory at such increased speed.

2. In an accessory driving mechanism adapted to be driven by an engine, the combination of an output member, a power transmission device for driving said output member from said engine, a planetary gear set having a sun gear and a ring gear and planet gears in mesh with said sun and ring gears and a planet gear carrier, said carrier being connected to the engine to be driven thereby, and means for driving said ring gear from said output member whereby said sun gear is driven at an overdrive ratio with respect to the engine when said output member is stationary for thereby driving an accessory at an increased speed.

3. In a mechanism for driving an accessory from an engine connected in tandem with a transmission, the combination of a planetary gear set having three drivingly interconnected elements, means for connecting one of said elements to be driven by the engine and means for connecting the other of said elements to be driven by a member of the transmission whereby the third of said elements is driven by the engine alone at a greater speed than engine speed when said transmission member is stationary.

4. In an accessory driving mechanism for a motor vehicle adapted to be driven by a vehicle engine, a transmission driven by said engine, a planetary gear set mounted on the front end of the crankshaft of the engine to be driven thereby, said gear set having three drivingly interconnected elements one of which is driven from the engine crankshaft, and means for driving a second of said elements from a member of the transmission whereby the third of said elements is driven by said engine at a different speed than the speed of the engine crankshaft for correspondingly driving an accessory therefrom when said transmission member is stationary.

5. In an accessory driving mechanism, the combination of a sun gear element, a ring gear element, planet gears in mesh with said sun and ring gear elements, and a planet gear carrier, means adapted for providing a driving connection to said carrier from an engine shaft, a pulley connected with one of said gear elements for driving the latter gear element, and a pulley connected with the other of said gear elements for driving an accessory therefrom at a changed speed with respect to said carrier when said first named pulley is stationary.

6. In an accessory driving mechanism, the combination of a ring gear, a sun gear, planet gears in mesh with said ring and sun gears and a planet gear carrier, means for mounting said carrier in driving relation with a power shaft and including a sleeve fixed with respect to the carrier, a pulley connected to said ring gear by means of which the ring gear may be driven from an external source of power, a housing connected to said sun gear and extending outwardly around said ring gear and having a pulley fixed thereon outwardly of the ring gear by means of which an accessory may be driven from the sun gear at an overdrive ratio with respect to said power shaft when said first named pulley is stationary.

7. In change speed gearing, the combination of a ring gear, a sun gear, planet gears in mesh with said ring and sun gears and a planet gear carrier, a sleeve fixed with respect to said carrier for receiving a power shaft by means of which said carrier may be driven, said ring gear being rotatably mounted on said sleeve by means of a hub portion having an obliquely extending exterior surface thereon, a sheet metal member mounted on said surface and having an opposite obliquely extending surface forming with said first named surface a pulley by means of which said ring gear may be driven, and a sheet metal housing member connected with said sun gear and extending outwardly and around said ring gear, an annular sheet metal member fixed on the outer periphery of said last named housing member and shaped in the form of a pulley for driving an accessory from said sun gear, a stationary sleeve extending around said first named sleeve, a lubricant retaining ring between said first named sheet metal member and said stationary sleeve, an annular sheet metal part fixed within said ring gear, and a lubricant retaining ring disposed between said last named part and said sun gear.

8. In an accessory driving mechanism adapted to be driven by an engine, a transmission driven by said engine and having an output member, said transmission comprising a hydrodynamic coupling device connected in tandem with multi-ratio gearing, and a planetary gear set having a sun gear element and a ring gear element and planet gears in mesh with said elements and a planet gear carrier, means for drivingly connecting said carrier to be driven from said engine, and means drivingly connecting said output member with one of said gear elements for thereby driving the other of said gear elements at an overdrive ratio with respect to the engine and for correspondingly driving an accessory in driving relationship with said last named gear element when said output member is stationary.

9. In an accessory driving mechanism adapted to be driven by an engine, a transmission driven from said engine and having an output member, said transmission comprising a hydrodynamic coupling device connected in tandem by means of an intermediate shaft with multi-ratio gearing, and a planetary gear set having a sun gear element and a ring gear element and planet gears in mesh with said elements and a planet gear carrier, means for drivingly connecting one of said elements to be driven from said intermediate shaft, and means for drivingly connecting said carrier to be driven from said engine whereby said other element is driven at an overdrive ratio with respect to said engine when said intermediate shaft is stationary for correspondingly driving an accessory in driving relationship with said last named element.

References Cited in the file of this patent
UNITED STATES PATENTS 2,372,226    Robin et al. _____ Mar. 27, 1945